2 Sheets—Sheet 1.

J. C. McCLAIN.
Apparatus for Illustrating the Principles of Music.

No. 229,545. Patented July 6, 1880.

Witnesses:
G. H. Remmett.
Belora Phillips.

Inventor.
John C. McClain
Per E. C. Finnick
his attorney

2 Sheets—Sheet 2.

J. C. McCLAIN.
Apparatus for Illustrating the Principles of Music.

No. 229,545.

Patented July 6, 1880.

Witnesses:
G. H. Bennett.
Zelora Phillips.

Inventor.
John C. McClain
Ben E. Funk
his attorney

UNITED STATES PATENT OFFICE.

JOHN C. McCLAIN, OF INDIANAPOLIS, INDIANA.

APPARATUS FOR ILLUSTRATING THE PRINCIPLES OF MUSIC.

SPECIFICATION forming part of Letters Patent No. 229,545, dated July 6, 1880.

Application filed December 22, 1879.

*To all whom it may concern:*

Be it known that I, JOHN C. McCLAIN, of Indianapolis, in the county of Marion and State of Indiana, have invented a new and useful Apparatus for Illustrating the Principles of the Science of Music, of which the following is a description, reference being had to the accompanying drawings.

The object of my invention is to provide a device by means of which may be illustrated the octave, relation of octaves, pitch, the diatonic scale, the chromatic scale, use of sharps and flats, temperament, steps and half-steps, tonics, transposition of diatonic scale, major and minor modes of diatonic scale, signatures, solfeggio, philosophy of chords, use of tuning-fork, construction of fixed-toned instruments, &c.

I attain these results by the mechanism illustrated in the accompanying drawings, of which there are two sheets, in which—

Figure 1:
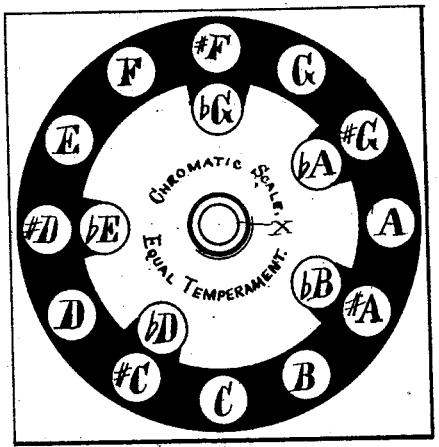
Figure 2:
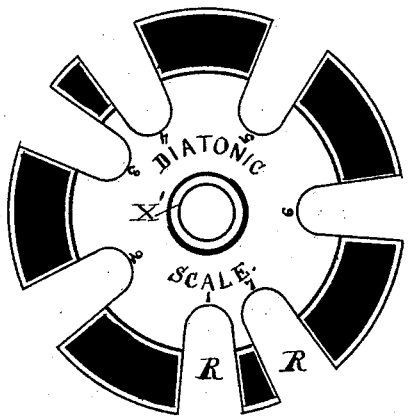
Figure 3:
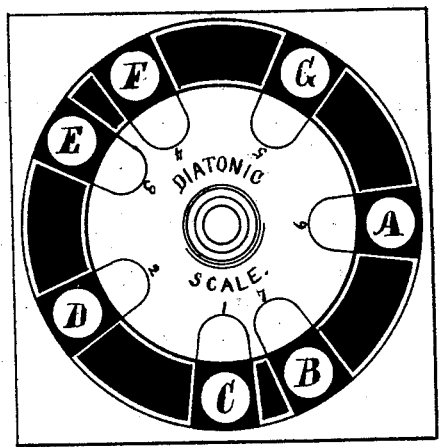
Figure 4:
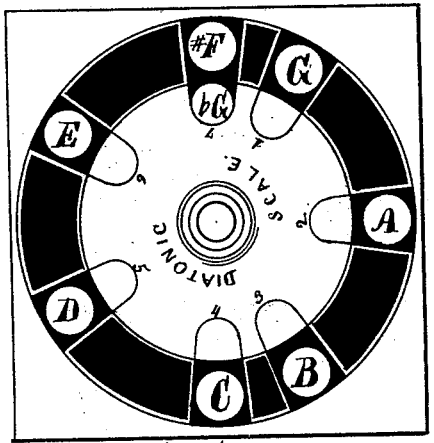
Figure 5:
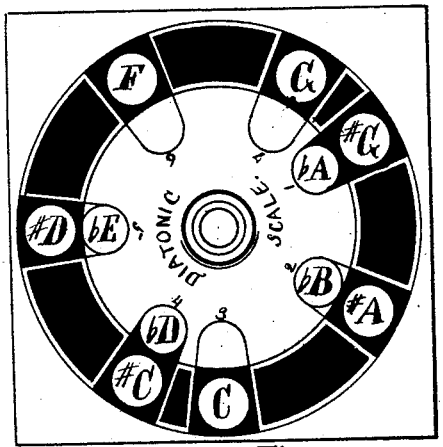
Figure 6:
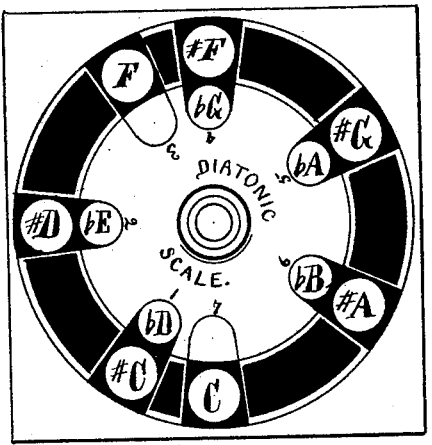
Figures 7, 8:
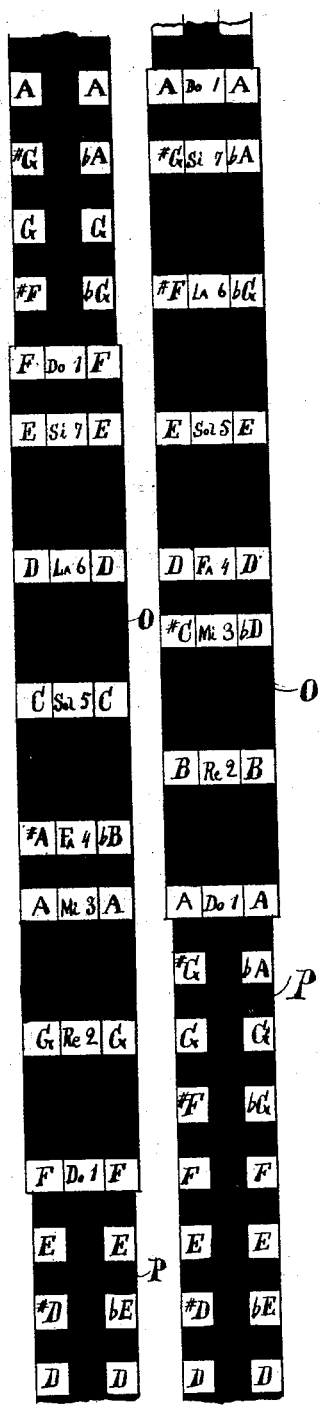
Figure 9:
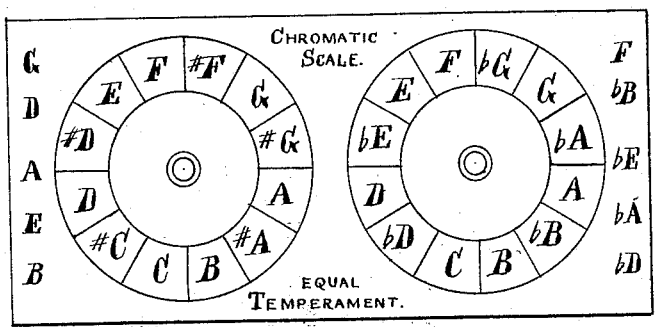
Figure 10:
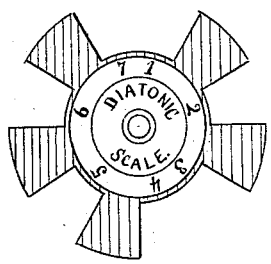
Figure 11:
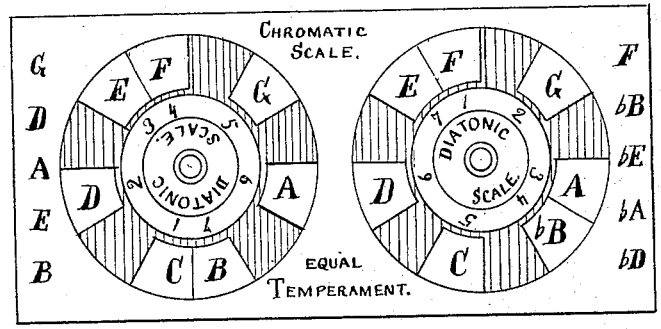

Figure 1, Sheet 1, represents the chromatic scale. Fig. 2 represents the adjustable diatonic scale adapted to Fig. 1. Fig. 3 represents Fig. 1 with Fig. 2 applied, and indicates the major form of the diatonic scale in key of C. Fig. 4 represents the same as Fig. 3, with the adjustable diatonic scale revolved, so as to indicate the major form of the diatonic scale in key of G. Fig. 5 represents another adjustment, and indicates the major form of the diatonic scale in key of A flat. Fig. 6 represents another adjustment, and indicates the major form of the diatonic scale in key of D flat. Fig. 7, Sheet 2, represents a modified form of the invention, and indicates the major form of the diatonic scale in key of F. Fig. 8 represents the same modified form as Fig. 7, and indicates the major form of the diatonic scale in key of A. Figs. 9 and 10 represent another modified form of the invention. In Fig. 9 the chromatic scale is represented in two equal forms. In the cut on the left the black keys are designated by sharps; in the cut on the right they are designated by flats. Fig. 10 represents the adjustable diatonic scale adapted to Fig. 9. Fig. 11 represents Fig. 9 with Fig. 10 applied, and indicates in the cut on the left the major form of the diatonic scale in the key of C, and in the cut on the right the same form in the key of F.

It will be observed in every adjustment represented that the minor form of the diatonic scale is also indicated by assuming 6 of the major form as the key-note of the minor form.

In Fig. 1 the chromatic scale is represented on a disk or board, the center of which is provided with a spindle, X. The degrees of the chromatic scale are represented by the letters and modifying-characters commonly used to designate the same. Intervals in pitch are represented by distance measured on the circular belt between degrees.

In Fig. 2 the adjustable diatonic scale is represented on a thin circular plate, the details of which depend on those of Fig. 1. The said plate is provided at its center with a hub, X', to fit on the spindle X of Fig. 1. The notches in the periphery of said plate represent the degrees of the diatonic scale, and distance on centers measured on the circular belt between degrees represent intervals in pitch. The said notches are numbered from 1 to 7, inclusive, in such manner as presents the major form of the diatonic scale.

When scale-plate, Fig. 2, is placed in position upon scale plate, Fig. 1, the notches R expose those degrees of the chromatic scale required to form the diatonic major scale, the key-note of which corresponds to 1 or "do" of the superposed diatonic-scale plate. It will also be observed that the same degrees of the chromatic scale are required to form the diatonic minor scale, the key-note of which corresponds to 6 or "la" of the said superposed diatonic scale. Since the diatonic-scale plate is constructed to revolve upon the chromatic-scale plate, 1 or "do" of the former may coincide with any degree of the latter. Therefore the diatonic scale, in every possible key, major and minor, may be indicated by one revolution of the said superposed and adjustable diatonic scale, and in every particular instance those degrees of the chromatic scale not required will be concealed.

Figs. 3, 4, 5, 6, 7, and 8 present some of the possible adjustments. The black keys are designated by the modifying-character ♯ or ♭, as the case may be, so as to prevent recurrence of a letter or letters of less interval than an octave. The modified form shown in Figs. 7 and 8 represents the chromatic and diatonic scales in vertical form. The chromatic scale in this form extends two octaves.

The adjustable diatonic scale is arranged to slide up and down, guided by lateral grooves and counterbalanced by a weight, (not shown in the drawing.) The degrees of the diatonic scale are represented by notches in the lateral margins of the slide, and the order of the degrees is written upon the center of said slide. The purpose of the said notches is the same as those marked R in Fig. 2, already described. In the series on the left the black keys are designated by sharps; in the series on the right they are designated by flats. This form may also be arranged horizontally.

The modified form represented in Figs. 9 and 10 is diminutive.

Both parts are of heavy paper-card, and are joined by an eyelet instead of spindle and hub, as in the larger forms. The diatonic-scale disk or slide is removable, and may be easily and readily separated from the chromatic-scale disk or board, except in the modified form represented in Fig. 11.

It is obvious that various other forms of construction may be followed and the same results be produced—viz., an illustration of the diatonic scale in its various keys and forms, together with an illustration of the details of the subject-matter thereto pertaining—without departing from the essence of my invention.

What I claim as new, and desire to secure by Letters Patent, is—

1. An adjustable disk or slide provided with a series of notches and a series of intervening wings, the said notches representing and illustrating the degrees of the diatonic scale, the distance between centers of notches representing and illustrating intervals in pitch, and the said wings illustrating and representing the elimination of degrees of the chromatic scale which do not occur in the diatonic scale of same tonic, substantially as shown and described, for the purposes specified.

2. The said adjustable disk or slide provided with notches and intervening wings, constructed and arranged as described, combined with a disk or board upon which are represented the degrees and intervals of the chromatic scale, as and for the purpose set forth.

In testimony whereof I have signed my name to this specification in the presence of two subscribing witnesses.

JOHN C. McCLAIN.

Witnesses:
  E. O. FRINK,
  G. H. RENNETT.